Oct. 23, 1962 S. H. BENMORE 3,059,661
FUEL BOWL FLOAT
Filed Sept. 28, 1959

INVENTOR.
STANLEY H. BENMORE
BY Whittemore
Hulbert & Belknap
ATTORNEYS

United States Patent Office 3,059,661
Patented Oct. 23, 1962

3,059,661
FUEL BOWL FLOAT
Stanley H. Benmore, Dearborn, Mich., assignor to Holley Carburetor Company, Van Dyke, Mich., a corporation of Michigan
Filed Sept. 28, 1959, Ser. No. 842,999
14 Claims. (Cl. 137—39)

The invention relates to a fuel bowl float and refers more particularly to means for regulating the position of a vehicle mounted carburetor fuel bowl float.

The floats in many carburetor fuel bowls are mounted for pivotal movement about a hinge at the side or one end thereof. In the past such carburetor fuel bowl floats have been adversely effected during right and left hand turns for side hinged floats, and during rapid acceleration or deceleration and in up or down hill travel for front or rear hinged floats. That is to say that the fuel within a carburetor fuel bowl will be caused to pile up or be at a higher level in one portion of the fuel bowl than it is at another due to forces acting on the fuel during the operating conditions indicated. Thus, due to the buoyant effect of the piled up fuel on the fuel bowl float, the fuel bowl float will tend to change positions within the fuel bowl during operation of a vehicle destroying the relation between the fuel level in the fuel bowl and the position of the float therein which is necessary to maintain the proper quantity of fuel within the fuel bowl.

It is therefore one of the purposes of the present invention to provide means in conjunction with a fuel bowl float operable to maintain the position of the fuel bowl float substantially constant in opposition to forces tending to change the position thereof due to operation of the vehicle to which the fuel bowl associated therewith is attached.

More specifically it is an object to provide means within a fuel bowl float responsive to forces tending to move the fuel within the fuel bowl in which the float is located so as to change the position of the fuel bowl float due to the buoyancy thereof to prevent the changing of the position of the fuel bowl float.

Still more specifically it is a purpose to provide a hollow fuel bowl float having a dish shaped bottom the lowest point of which is at the center thereof with a steel ball positioned at said center and movable, in response to forces causing fuel to pile up in a particular portion of the fuel bowl, in the direction of said fuel pile up whereby the position of the float is maintained substantially constant.

It is a further object to provide means for regulating the position of a fuel bowl float during operation of a vehicle having a fuel bowl mounted thereon in which said fuel bowl float is located which is simple in construction, economical to produce and efficient in operation.

Other objects and features of the invention will become apparent as the description proceeds, especially when taken in conjunction with the accompanying drawings, illustrating a preferred embodiment of the invention, wherein.

With reference to the drawings a particular embodiment of the improved fuel bowl float of the invention will now be considered.

Figure 1:
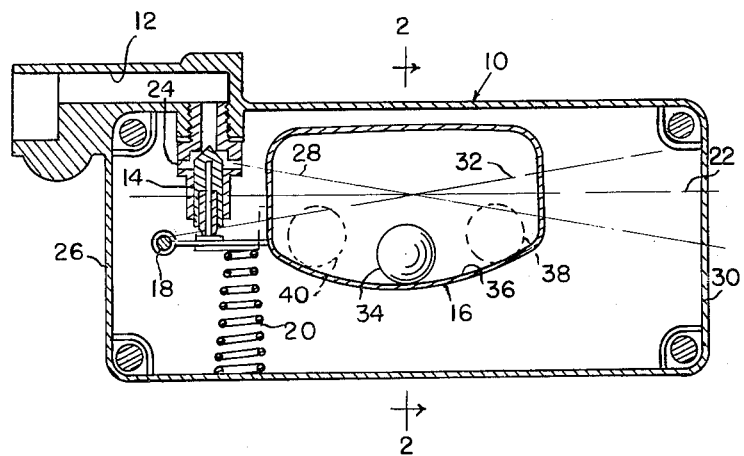
FIGURE 1 is a longitudinal section through a carburetor fuel bowl having a side hinged fuel bowl float.

In FIGURE 1 there is provided a carburetor fuel bowl generally indicated 10 including fuel inlet passage 12, inlet needle valve 14 and fuel bowl float 16 pivotally mounted at 18 to the side of the fuel bowl 10. The spring 20 is provided to aid the float 16 in operating the valve 14 to maintain a desired fuel level indicated at 22 within the fuel bowl 10.

The operation of the apparatus thus far described is well known in the carburetor art. Fuel is pumped into fuel inlet passage 12 by convenient means such as a fuel pump. Fuel is taken from the fuel bowl through convenient outlet means (not shown) for supplying the operating fuel of an engine such as an automobile engine. When the fuel is withdrawn from the fuel bowl 10 the level thereof will drop below the desired level 22 causing the float 16 to pivot about point 18 in a clockwise direction allowing the needle valve 14 to open permitting fuel from passage 12 to enter the fuel bowl 10 through laterally extending passages 24. The fuel entering the fuel bowl from the passage 24 will cause the fuel level to again reach the level 22 at which time the needle valve is closed due to counter-clockwise pivoting of the float 16. Thus during normal operation the level of the fuel in the fuel bowl 10 is maintained at the desired operating level 22 through the inner action of the spring 20, fuel bowl float 16 and needle valve 14.

However, with the fuel bowl just described mounted for example on an automobile the normal operation of the fuel bowl float as described is hindered under certain operating conditions such as during right and left hand turns for the side hinged fuel bowl float illustrated in FIGURE 1. That is to say during right hand turns the fuel in the fuel bowl 10 as shown in FIGURE 1 may assume a higher level or pile up in the inlet end 26 of the fuel bowl as indicated by the fuel level line 28 due to centrifugal force acting on the fuel within the fuel bowl which would have normally maintained the desired level indicated at 22 within the fuel bowl. This shifting of the fuel within the fuel bowl 10 due to centrifugal forces during a right hand turn will cause the upward resulted of the buoyant force acting on the fuel bowl float to move toward the inlet end of the fuel bowl whereby the lever arm acting between the pivot point 18 and the resultant buoyant force is reduced thereby requiring more buoyant force to maintain the needle valve 14 closed. The extra buoyant force will be provided as more fuel enters the fuel bowl in the manner explained above whereby the total quantity of fuel within the fuel bowl will be increased during right hand turns.

Similarly during left hand turn the fuel is caused by centrifugal force to pile up at the end 30 of the fuel bowl as indicated at 32 in FIGURE 1 causing the resultant of the buoyant force acting on the fuel bowl float to move outward with respect to the pivot point 18 whereupon less than the desired quantity of fuel within the fuel bowl will close the needle valve 14. Thus during left hand turns the quantity of fuel within the fuel bowl may materially diminish unless means to compensate for the effect of the centrifugal force on the fuel within the carburetor fuel bowl is provided.

Figure 2:
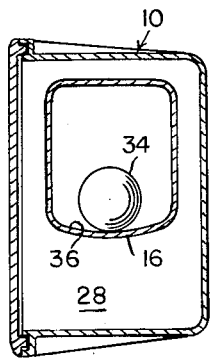
FIGURE 2 is a transverse section through the fuel bowl and fuel bowl float illustrated in FIGURE 1 taken on the line 2—2 in FIGURE 1.

According to the invention compensating means comprising a ball 34 acting in conjunction with a fuel bowl float having an arcuate bottom 36 is provided to compensate for the effect of the centrifugal forces acting on the fuel in the fuel bowl 10. The bottom 36 of the hollow fuel bowl float 16 as shown in FIGURES 1 and 2 is convex outwardly in both its longitudinal and lateral dimensions, the lowest point of the convex lower surfaces in both the longitudinal and lateral dimensions of the embodiment of the invention shown being at the center of the fuel bowl float during normal operation. The ball 34 which may be of steel or other suitable metal is placed within the hollow fuel bowl float 10 as shown and is normally maintained at the center of the fuel bowl float by the forces of gravity.

The usual operation of the fuel bowl and fuel bowl float is thus not materially effected by the ball 34. However during right and left hand turns of the side pivoted fuel bowl float illustrated in FIGURES 1 and 2 the ball 34 is also effected by the centrifugal force tending to pile the fuel up at the ends 26 or 30 of the fuel bowl in such a manner that the movement of the resultant of the buoyant force acting on the fuel bowl float due to the piling up of fuel is counteracted by the forces exerted on the fuel bowl float due to movement of said ball caused by said centrifugal force.

Thus during a left hand turn as centrifugal force tends to pile the fuel up in the end 30 of the fuel bowl as indicated by the surface line 32 the ball 34 will similarly be caused to move to a position as indicated at 38 wherein it is also closer to the end 30 of the fuel bowl. Thus there is a tendency for the resultant of the buoyant forces acting on the fuel bowl float to move outward toward the end 30 of the fuel bowl due to the buoyant action on the fuel bowl float of the fuel which is piled up in the end 30 which tendency is compensated for by the opposite effect which the weight of the ball 34 has in the position shown at 38 in FIGURE 1 at the end of the fuel bowl float adjacent the end 30 of the fuel bowl. Thus with a properly designed arcuate surface 36 the opposite tendencies of the piled up fuel and the moving ball 34 can be caused to cancel each other whereby the position of the fuel bowl float will remain substantially constant during a left hand turn except for normal action due to use of fuel in the fuel bowl as previously described.

Similarly during right hand turns the ball 34 is caused to move toward the end 26 of the fuel bowl to the position indicated at 40 such that the forces acting on the fuel bowl float due thereto tend to counteract the forces acting on the fuel bowl float due to the piling up of the fuel within the fuel bowl at the end 26 to cause the position of the fuel bowl float to remain substantially constant during right hand turns.

While a specific embodiment of the present invention has been disclosed it will be readily apparent to those skilled in the art that modifications thereof are possible. For example a fluid may be placed within a fuel bowl float having a flat bottom rather than the ball 34 in a fuel bowl float having an arcuate bottom. Likewise while the invention has been described in conjunction with a side hinged fuel bowl float it will be understood that the principles thereof are equally applicable to end mounted fuel bowl floats and distinct advantages in connection therewith are obtained during acceleration and deceleration of a vehicle in which the fuel bowl and float are mounted as well as during up and down hill travel thereof. Therefore, it is desired to incorporate within the scope of this invention all such modifications as may be suggested by the disclosure contained herein.

The drawings and the foregoing specification constitute a description of the improved fuel bowl float in such full, clear, concise and exact terms as to enable any person skilled in the art to practice the invention, the scope of which is indicated by the appended claims.

What I claim as my invention is:

1. A fuel bowl for use in a vehicle, a fuel bowl float hingedly mounted for pivotal movement within said fuel bowl in response to the buoyant effect of fuel in said fuel bowl, and means operably associated with the fuel bowl float for maintaining the position of said fuel bowl float substantially constant in opposition to the forces tending to shift the position of said fuel bowl float due to piling up of fuel in any area of said fuel bowl during operation of the vehicle.

2. A fuel bowl for use in a vehicle, a fuel bowl float hingedly mounted for pivotal movement within said fuel bowl in response to the buoyant effect of fuel in said fuel bowl, a weight operably associated with said fuel bowl float and movable with respect to the hinged mounting of the fuel bowl float in response to forces tending to pile up fuel in any portion of said fuel bowl during operation of the vehicle for maintaining the position of the fuel bowl float substantially constant during operation of the vehicle.

3. A fuel bowl for use in a vehicle, a hollow fuel bowl float hingedly mounted for pivotal movement within said fuel bowl in response to the buoyant effect of fuel in said fuel bowl, and means within said fuel bowl float operably associated with the fuel bowl float for maintaining the position of said fuel bowl float substantially constant in opposition to the forces tending to shift the position of the fuel bowl float due to piling up of fuel in particular areas of said fuel bowl during operation of the vehicle.

4. A fuel bowl for use in a vehicle, a hollow fuel bowl float hingedly mounted for pivotal movement within said fuel bowl in response to the buoyant effect of fuel in said fuel bowl, said fuel bowl float having an outwardly convex bottom, and a spherical member within said fuel bowl float operably associated with the fuel bowl float for maintaining the position of said fuel bowl float substantially constant in opposition to the forces tending to shift the position of said fuel bowl float due to piling up of fuel in particular areas of said fuel bowl during operation of the vehicle.

5. A fuel bowl for use in a vehicle, a hollow fuel bowl float hingedly mounted for pivotal movement within said fuel bowl in response to the buoyant effect of fuel in said fuel bowl, said fuel bowl float having an outwardly convex bottom the lowest point in which is at the center of the fuel bowl when said fuel is at a predetermined operating level, and a spherical member within said fuel bowl float operably associated with the fuel bowl float for maintaining the position of said fuel bowl float substantially constant in opposition to the forces tending to shift the position of said fuel bowl float due to piling up of fuel in particular areas of said fuel bowl during operation of the vehicle.

6. A fuel bowl for use in a vehicle, a hollow fuel bowl float hingedly mounted in said fuel bowl for pivotal movement about an axis extending longitudinally of the vehicle in response to the buoyant effect of fuel in said fuel bowl, said fuel bowl float having an outwardly convex bottom, and a spherical member within said fuel bowl float operably associated with the fuel bowl float for maintaining the position of said fuel bowl float substantially constant in opposition to the forces tending to shift the position of said fuel bowl float due to piling up of fuel in the fuel bowl at the one end or the other thereof during turning of the vehicle.

7. A vehicle, a carburetor fuel bowl assembly secured to said vehicle, comprising a fuel bowl, a fuel inlet passage for said fuel bowl, a valve connection between said fuel bowl and fuel inlet passage, a fuel bowl float hingedly mounted within said fuel bowl for pivotal movement therein in response to the buoyant effect of fuel in said fuel bowl, said fuel bowl float being operable to actuate said valve to maintain a predetermined quantity of fuel within said fuel bowl, a spring acting between said fuel bowl and fuel bowl float to assist the float in maintaining said predetermined fuel level, and means operably associated with the fuel bowl float for maintaining the position of the fuel bowl float substantially constant in opposition to the forces tending to shift the position of said fuel bowl float due to piling up of fuel in any area of said fuel bowl during operation of the vehicle mounting the fuel bowl.

8. A vehicle, a carburetor fuel bowl assembly secured to said vehicle, comprising a fuel bowl, a fuel inlet passage for said fuel bowl, a valve connection between said fuel bowl and fuel inlet passage, a fuel bowl float hingedly mounted within said fuel bowl for pivotal movement therein in response to the buoyant effect of fuel in said fuel bowl, said fuel bowl float being operable to actuate said valve to maintain a predetermined quantity of fuel within said fuel bowl, a spring acting between said fuel bowl and fuel bowl float to assist the float in maintaining said predetermined fuel level, said fuel bowl float having an outwardly convex bottom the lowest point in which is at the center of the fuel bowl float when said predetermined quantity of fuel is within the fuel bowl and a spherical weight freely movable within said fuel bowl float operably associated with the fuel bowl float for maintaining the position of the fuel bowl float substantially constant in opposition to the forces tending to shift the position of said fuel bowl float due to piling up of fuel in particular areas of said fuel bowl during operation of the vehicle mounting the fuel bowl.

9. A fuel bowl for use in a vehicle, a fuel inlet valve for admitting fuel into said fuel bowl, a fuel bowl float hingedly mounted for pivotal movement within said fuel bowl in response to the buoyant force of fuel in said fuel bowl to control the opening and closing of the fuel inlet valve, and inertia responsive means operably associated with said fuel bowl float for counter-balancing variations in the buoyant force acting on the fuel bowl float due to piling up of fuel in any area of the fuel bowl on movement of the vehicle.

10. A fuel bowl for use in a vehicle, a fuel inlet valve for admitting fuel into said fuel bowl, a fuel bowl float hingedly mounted for pivotal movement within said fuel bowl in response to the buoyant force of fuel in said fuel bowl to control the opening and closing of the fuel inlet valve, and inertia responsive means for maintaining the force exerted on the fuel inlet valve by the fuel bowl float due to a predetermined quantity of fuel in the fuel bowl substantially constant during movement of the vehicle.

11. A fuel bowl, a fuel inlet valve for admitting fuel into said fuel bowl, a fuel bowl float hingedly mounted for pivotal movement within said fuel bowl in response to the buoyant force of fuel in said fuel bowl to control the opening and closing of the fuel inlet valve, and inertia responsive means operably associated with said fuel bowl float for maintaining a predetermined fuel bowl float position during movement of the fuel bowl and consequent piling up of fuel in any area thereof.

12. A fuel bowl, a fuel inlet valve for admitting fuel into said fuel bowl, a hollow fuel bowl float mounted for pivotal movement within said fuel bowl in response to the buoyant force of fuel in said fuel bowl to control the opening and closing of the fuel inlet valve, and inertia responsive means positioned within said fuel bowl float for counter-balancing variations in the buoyant forces acting on the fuel bowl float during piling up of fuel in particular areas of the fuel bowl during movement of the fuel bowl.

13. In combination with a fuel bowl for use with a movable device, a fuel bowl float and inertia responsive means operably associated with said fuel bowl float for preventing movement of the fuel bowl float due to movement of the fuel bowl and consequent piling up of fuel in any area thereof.

14. In combination with a fuel bowl for use with a movable device, a hollow fuel bowl float positioned within said fuel bowl and inertia responsive means positioned within the fuel bowl float for preventing movement of the fuel bowl float due to movement of the fuel bowl and consequent piling up of fuel in particular areas thereof.

References Cited in the file of this patent

UNITED STATES PATENTS

| | | |
|---|---|---|
| 2,388,793 | McCarty | Nov. 13, 1945 |
| 2,394,994 | Gibb | Feb. 19, 1946 |
| 2,724,403 | De Salardi | Nov. 22, 1955 |
| 2,847,021 | Carlson | Aug. 12, 1958 |
| 2,902,045 | Lunn | Sept. 1, 1959 |